Patented Jan. 13, 1948

2,434,582

UNITED STATES PATENT OFFICE 2,434,582

PRODUCTION OF VULCANIZABLE ISOBUTYLENE-ISOPRENE COPOLYMERS

Reuben F. Pfennig, Goose Creek, and Melvin H. Gertz, Baytown, Tex., assignors to Standard Oil Development Company, a corporation of Delaware No Drawing. Application December 29, 1944, Serial No. 570,467

1 Claim. (Cl. 260—93)

The present invention is concerned with a method for producing vulcanizable materials in which olefinic hydrocarbons, specifically, mono-olefins and diolefins are reacted in the presence of a catalyst at a low temperature. More particularly the invention is concerned with the production of vulcanizable polymer in which a particular type of reactor is employed, the amount of catalyst made available during the reaction is critical, and in which the per cent of vulcanizable polymer in the reactants is kept below a desirable critical point.

Heretofore it has been the practice to polymerize olefinic material such as the iso-olefins, for example, isobutylene either alone or in admixture with a diolefin such as butadiene, isoprene, piperylene, and the like at temperatures ranging from about —80° F. down to about —164° F. to yield a high molecular weight rubbery polymer which is reactive with sulfur and other curing agents in a curing reaction. It is desirable that a number of physical characteristics of these finished products fall within predetermined ranges. A well-known commercial product produced by such an operation is GR–I rubber, a copolymer of isobutylene and isoprene as set forth in section A-3–a of "Specifications for Government Synthetic Rubbers," published January 1, 1947, by Reconstruction Finance Corporation, Office of Rubber Reserve, pages 19 and 20. Specifications for this material are given herewith as an example of the characteristics necessary to meet the specifications of a common commercial product.

Table I

| | |
|---|---|
| Mooney viscosity, 8 minute | 40–50 |
| 20 minutes modulus | 550–850 |
| 40 minutes modulus | 850–1150 |
| 80 minutes modulus | 1100–1500 |
| 40 minutes tensile (minimum) | 2500 |
| 40 minutes elongation (minimum) | 600 |

The Mooney viscosity of the product is determined by the Mooney plastometer described in the Vanderbilt Rubber Handbook, page 254, eighth edition (1942), J. M. Ball, editor, R. T. Vanderbilt Co., New York, N. Y. The remaining values, modulus, tensile and elongation, may be determined by conventional testing methods.

It has been customary heretofore to polymerize the olefinic material by forming a solution of reactants dissolved in a low freezing, non-complex forming solvent of the type of methyl or ethyl chloride and adding thereto a Friedel-Crafts type of catalyst formed by dissolving a suitable material such as aluminum chloride in a solvent of the character of methyl or ethyl chloride. It has been usual to conduct such reactions in batch equipment with the solution of catalyst usually injected into a body of solution of hydrocarbon dissolving solvent. This conventional type of reaction is objectional in that employment of the diluent results in the introduction of a considerable quantity of materials which inhibit or poison the reaction or make it difficult to control. The Mooney viscosity of the product produced in accordance with such reactions is almost invariably above the specification range given in Table I. Accordingly, in order to produce a salable product, it is necessary to lower the viscosity thereof by suitable plasticization during the milling operations.

Furthermore, the nature of the diluents, i. e. the alkyl halides, make them undesirable to introduce into a reaction system since they are extremely difficult to retain in a system in which other low boiling materials are handled successfully. The alkyl halides are soluble in water, in the hydrocarbon reactants and in the product and consequently large amounts are unrecoverable. A greater disadvantage to the employment of the alkyl halides as a diluent or solvent for both the catalyst and the hydrocarbon is the toxic nature of these materials, especially the methyl halide. When the human system absorbs these vapors, it is believed that methyl alcohol is formed in the tissues by hydrolysis which may result in serious illness and sometimes fatalities. It is, therefore, desirable to eliminate the diluent from this reaction.

The present invention is specifically directed to a process for conducting the polymerization of mono-olefins and diolefins in the substantial absence of a diluent material. The only point where it is necessary to employ diluent in the practice of the present invention is in the forming of the catalyst solution but the amount of diluent introduced into the reactants by way of the catalyst solution is minor. In forming the catalyst solution, methyl chloride or ethyl chloride may be employed as the solvent, if desired. Solvents of this type may be eliminated entirely from the system by employing some other type of catalyst, such as solutions of active metal halide in hydrocarbon or other liquids in which they are soluble or in which they form complexes which lend themselves to the reaction. For example, it may be desirable to employ boron fluoride dissolved in a non-reactive hydrocarbon as a catalyst for the reaction.

The present invention may be briefly described as embodying a polymerization reaction in which a feed stock is formed consisting of a mixture of purified mono-olefin, such as isobutylene, and a diolefin, such as isoprene, in a suitable ratio to form a vulcanizable product, chilling the mixture to a temperature in the neighborhood of −150° F. and then reacting the chilled mixture with a chilled solution of a Friedel-Crafts type of catalyst such as aluminum chloride dissolved in methyl chloride in an amount of a concentration no greater than about 1.5 grams of active catalytic material per liter of catalyst solution. The chilled catalyst solution and the chilled hydrocarbon feed are rapidly and thoroughly mixed in a free-space in a falling stream. The per cent of polymer produced in the stream is a function of the concentration of the catalyst solution and of the ratio of the catalyst to the hydrocarbon feed stock. In turn, the Mooney viscosity of the polymer product varies inversely with the per cent of polymer produced in the stream of hydrocarbon reactants and catalyst and, accordingly, the characteristics of the product may be controlled as desired by control of the amount of polymer formed in the stream.

The reaction is preferably conducted in apparatus according to the disclosures of U. S. Serial No. 491,028, filed June 16, 1943, for John D. Calfee, Paul J. Flory, and Robert M. Thomas. The application of Calfee et al. is concerned with a simple, continuous process for the polymerization of olefinic material in which the cold olefin is combined with a jet of chilled catalyst solution through a nozzle submerged in the olefinic stream. The reaction takes place in a turbulently flowing stream of mixed olefinic material and catalyst solution and approaches completion after a relatively few feet of travel in free space. While the invention is not specifically restricted to this type of apparatus, it is preferred that the invention be conducted so that reaction occurs in a free space.

As the reaction occurs, the reactant materials are allowed to fall into a body of quenching fluid such as water or aqueous alcoholic solutions. The unreacted hydrocarbons are recovered, purified and returned to the reaction scene. By virtue of employing purified hydrocarbons in the absence of a diluent or solvent, it is possible to recover substantially all of the hydrocarbons with very little loss of the solvent employed in making up the catalytic solution since the amount of solvent used is so small, its loss is negligible.

In the practice of the present invention, it is important that the feed hydrocarbons, that is the monoolefins, such as isobutylene, and diolefins, such as isoprene, be relatively pure. It is also important that they be used in pure state free from contaminating diluents, such as the alkyl halides, which has not been common practice in the past.

Successfully conducting the afore-mentioned type of polymerization reaction at low temperatures to produce vulcanizable polymers in the absence of a diluent or solvent in the hydrocarbons is an unexpected result in that heretofore when the reaction was conducted in the conventional type of batch equipment, the polymer dissolved in the hydrocarbons if a solvent or diluent were absent, and formed a syrupy, viscous mass which clogged the equipment. Furthermore, the reaction with substantially pure hydrocarbons in the absence of a diluent was inoperable insofar as producing a vulcanizable product of the desired quality.

In order to illustrate further the desirable practice of the present invention, a number of runs were made in which feed stocks comprising 97.6% by weight of isobutylene and 2.4% by weight of isoprene were reacted in apparatus similar to that disclosed in the afore-mentioned Calfee et al. application with a hydrocarbon feed temperature in the range between −143° and −151° F., a catalyst solution temperature in the range of −124° to −130° F., and employing catalyst solutions of strengths ranging between 0.10 gram of aluminum chloride per 100 ml. of methyl chloride to 0.182 gram of aluminum chloride per 100 ml. of solvent. By varying the catalyst rate the per cent of polymer in the reactants was also varied. The effect of varying the catalyst rate and therefore the per cent of polymer and the effect of catalyst concentration is reflected in the Mooney viscosity of the polymer produced which varies inversely with the per cent of polymer.

Specific operating conditions along with inspection data on the products obtained are presented in Table II.

*Table II*

| Run Number | 1 | 2 | 3 | 4 | 5 | 6 | 7 | 8 | 9 |
|---|---|---|---|---|---|---|---|---|---|
| Catalyst Concentration Gm./100 ml | 0.142 | 0.142 | 0.100 | 0.100 | 0.182 | 0.141 | 0.127 | 0.127 | 0.127 |
| Temperature, °F.: | | | | | | | | | |
| Feed | −143 | −143 | −144 | −146 | −147 | −148 | −150 | −149 | −150 |
| Catalyst | −124 | −126 | −129 | −128 | −127 | −129 | −129 | −130 | −130 |
| Feed Rate: | | | | | | | | | |
| Hydrocarbon, Kg./Hr | 51.0 | 54.5 | 52.2 | 29.0 | 65.7 | 54.8 | 60.7 | 60.2 | 65.7 |
| AlCl$_3$, Gm./Hr | 12.2 | 9.1 | 11.3 | 12.1 | 10.2 | 12.3 | 15.4 | 14.4 | 16.1 |
| Ratio, $\frac{\text{Gms. AlCl}_3}{\text{Kg. Hydrocarbons}}$ | .240 | .167 | .217 | .417 | .155 | .224 | .253 | .239 | .245 |
| Conversion, per cent on total olefin | 12.5 | 6.5 | 5.5 | 14.8 | 7.0 | 5.4 | 6.5 | 5.7 | 5.7 |
| Polymer production, Kg./Hr | 6.36 | 3.54 | 2.89 | 4.28 | 4.62 | 2.96 | 3.73 | 3.40 | 3.75 |
| Catalyst Efficiency Kg./Kg. AlCl$_3$ | 522 | 390 | 256 | 354 | 454 | 242 | 243 | 237 | 234 |
| Slurry Concentration, Wt. per cent on Reactants | 10.6 | 5.8 | 4.5 | 10.3 | 6.47 | 4.64 | 5.3 | 4.7 | 4.8 |
| Mooney Viscosity, 8 Min | 31 | 38 | 44 | 30 | 26 | 39 | 46 | 45 | 47 |
| Tread Stock: | | | | | | | | | |
| Tensile Strength— | | | | | | | | | |
| 20 Minute Cure | 2,415 | 2,615 | 2,780 | 2,435 | 2,100 | 2,590 | 2,965 | 2,750 | 2,825 |
| 40 Minute Cure | 2,515 | 2,625 | 2,815 | 2,425 | 2,330 | 2,700 | 2,840 | 2,805 | 2,860 |
| 80 Minute Cure | 2,455 | 2,565 | 2,675 | 2,320 | 2,300 | 2,720 | 2,945 | 2,735 | 2,825 |
| Elongation— | | | | | | | | | |
| 20 Minute Cure | 825 | 815 | 830 | 945 | 930 | 925 | 835 | 850 | 810 |
| 40 Minute Cure | 750 | 745 | 730 | 785 | 905 | 885 | 725 | 750 | 735 |
| 80 Minute Cure | 650 | 680 | 685 | 725 | 820 | 755 | 680 | 700 | 655 |
| Modulus— | | | | | | | | | |
| 20 Minute Cure | 720 | 880 | 805 | 525 | 410 | 495 | 785 | 670 | 740 |
| 40 Minute Cure | 1,015 | 1,030 | 1,065 | 735 | 610 | 710 | 1,050 | 925 | 905 |
| 80 Minute Cure | 1,180 | 1,215 | 1,270 | 880 | 800 | 925 | 1,275 | 1,170 | 1,200 |

It will be seen that the products of runs 3, 7 and 9 meet the specifications of GR–I–50 rubber, while the products obtained from runs 2 and 6 approach closely the Mooney viscosity required by these specifications. It will be apparent that by controlling the catalyst concentration and the concentration of polymers in the reactants a polymer meeting the specifications of GR–I–50 may be obtained from pure hydrocarbon feed stock without the use of a diluent therein. As long as the per cent of polymers in the slurry is kept below about 8 and the catalyst concentration kept below 0.14, the product meets the specifications for GR–I–50. It will be noted that when the catalyst concentration exceeds 0.14, the Mooney viscosity is not satisfactory for GR–I–50 rubber even when the slurry concentrations are below 8 per cent and conversely when the slurry concentration exceeds 8 per cent the product does not meet these specifications even though the catalyst concentration is maintained below 0.14.

It will be seen that we have disclosed a method for producing vulcanizable polymer by directing the polymerization of mono-olefins and diolefins in the form of a pure hydrocarbon feed stock in the absence of a diluent. The polymerization is conducted by admixing the hydrocarbon reactants with a catalyst solution or complex of the Friedel-Crafts type and allowing the reaction to take place at low temperature with the hydrocarbon reactant and catalyst in a freely falling stream. A desirable high quality polymer product is obtained by controlling within critical limits the concentration of catalyst in the solution or complex added to the hydrocarbon reactants and the per cent of polymers present in the resultant stream.

The nature and objects of the present invention having been fully described and illustrated, what we wish to claim as new and useful and to secure by Letters Patent is:

In a process for producing a vulcanizable polymer wherein a chilled mixture consisting of isobutylene, isoprene, and aluminum chloride catalyst dissolved in methyl chloride is produced in free space and reacts to form vulcanizable polymer in said free space, the steps of intimately admixing in a falling steam in free space a chilled stream consisting of about 98 parts of said isobutylene and about 2 parts of said isoprene and a chilled stream consisting of said aluminum chloride catalyst dissolved in said methyl chloride in a concentration in the range from 1.0 to 1.4 grams of catalyst per liter of solution to form a reaction mixture, forming vulcanizable polymer in the falling stream, and maintaining the concentration of polymer in the reaction mixture at no greater than 8% by feeding reactants in the ratio range of 0.217 to 0.253 gram of aluminum chloride per kilogram of hydrocarbons.

REUBEN F. PFENNIG.
MELVIN H. GERTZ.

REFERENCES CITED

The following references are of record in the file of this patent:

UNITED STATES PATENTS

| Number | Name | Date |
|---|---|---|
| Re. 22,210 | DeSimo | Oct. 27, 1942 |
| 2,280,802 | Depew | Apr. 28, 1942 |
| 2,356,128 | Thomas | Aug. 22, 1944 |
| 2,366,460 | Semon | Jan. 2, 1945 |
| 2,375,256 | Soday | May 8, 1945 |

Certificate of Correction

Patent No. 2,434,582 January 13, 1948

REUBEN F. PFENNIG ET AL.

It is hereby certified that error appears in the printed specification of the above numbered patent requiring correction as follows:

Column 6, line 9, for the word "steam" read *stream*;

and that the said Letters Patent should be read with this correction therein that the same may conform to the record of the case in the Patent Office.

Signed and sealed this 31st day of January, A. D. 1950.

[SEAL]

THOMAS F. MURPHY,
*Assistant Commissioner of Patents.*